J. KELLY.
DEMOUNTABLE WHEEL.
APPLICATION FILED FEB. 15, 1916.
1,204,879.
Patented Nov. 14, 1916.
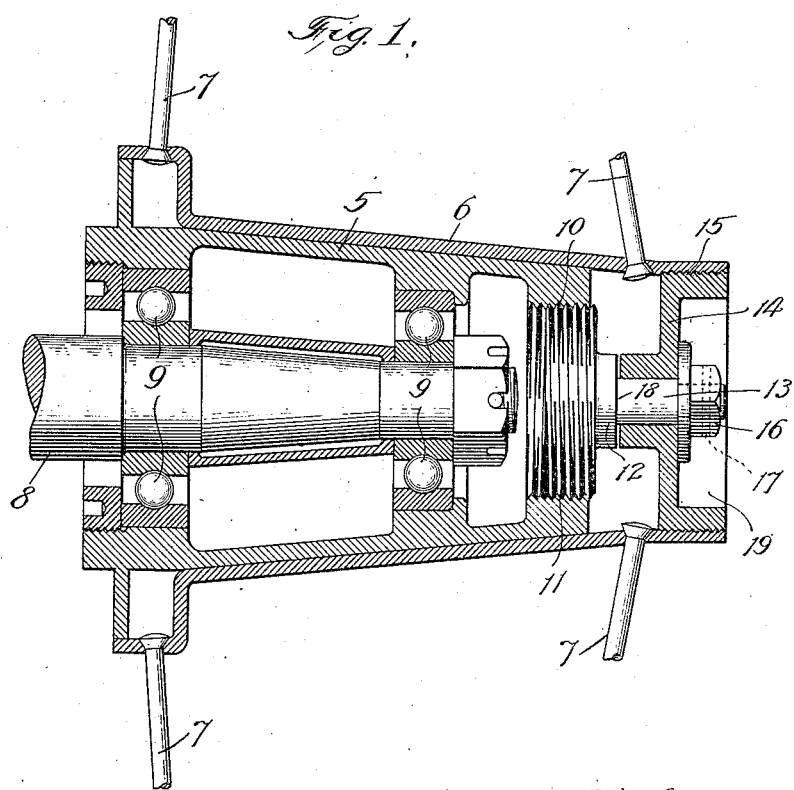
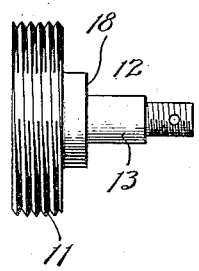
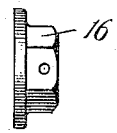
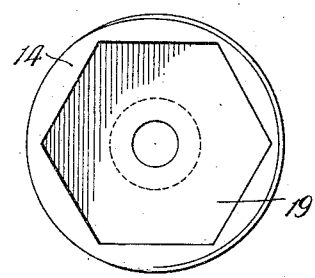
Witnesses:
Chas. H. Buell.
Irwin C. Bowman.
Inventor:
John Kelly,
By Dyrenforth, Lee, Chritton and Wiles
Attys.

UNITED STATES PATENT OFFICE.

JOHN KELLY, OF CHICAGO, ILLINOIS.

DEMOUNTABLE WHEEL.

1,204,879.	Specification of Letters Patent.	Patented Nov. 14, 1916.

Application filed February 15, 1916. Serial No. 78,374.

*To all whom it may concern:*

Be it known that I, JOHN KELLY, a citizen of the United States, residing at Chicago, in the county of Cook and State of Illinois, have invented a new and useful Improvement in Demountable Wheels, of which the following is a specification.

My invention relates, more particularly, to demountable wheels of the type employing an inner hub-member mounted to rotate and an outer hub-member adapted to be telescoped with the inner hub-member and secured in position on the latter to rotate therewith; and my objects are, generally stated, to provide a novel, simple and very effective means whereby the outer hub-member may be readily applied to and removed from, operative position on the inner hub-member.

Referring to the accompanying drawing: Figure 1 is a longitudinal, sectional view, partly broken, of a wheel constructed in accordance with my invention. Fig. 2 is a view in elevation of a threaded spindle forming a part of the construction. Fig. 3 is a similar view of a nut coöperating with the spindle of Fig. 2; and Fig. 4, an end view of a cap-member employed.

The inner hub-member is illustrated at 5 and the outer hub-member which telescopes therewith is represented at 6, the outer surface of the inner hub-member 5 and the inner surface of the outer hub-member 6 being tapered, as represented. The member 5, in practice, would not, by preference, be removable in the demounting operation, with the outer hub-member 6, which carries the spokes 7, but would be connected with the driving axle, not shown, of the vehicle, in any suitable manner as is well known in the art, when the wheel is a driving wheel, as, for example, the rear wheel of an automobile; and when not a driving wheel, as in the case of the front wheel of an automobile, would be journaled on a stationary axle, as for example that shown at 8, with bearings 9 interposed between these parts, or fixed on a rotary axle (not shown).

The outer end of the inner hub-member 5 contains a threaded opening 10 adapted to coöperate with the externally-threaded head 11 of a spindle 12. The spindle 12 is journaled at a reduced section 13 thereof in a cap 14 which has threaded engagement with the outer end of the outer hub-member 6, as represented at 15, a nut 16 being rigidly secured to the outer end of the spindle 12, as by threading it thereon and providing a pin 17 passing through the nut and spindle. The spindle at the inner face of the cap 14 is provided with a shoulder 18 which opposes the cap, and the nut 16 affords a shoulder on the spindle opposing the opposite face of the cap, for a purpose hereinafter explained.

In assembling the outer and inner hub members, the outer hub-member 6 is telescoped with the inner hub-member 5 to a position in which the threaded head 11 of the spindle 12 contacts the outer end of the opening 10, the spindle having been previously assembled with the outer hub-member 6, as shown. The spindle 12 is then rotated in the cap 14, by a wrench (not shown) or any other suitable tool, in a direction for screwing the spindle into the opening 10, the engagement of the shoulder afforded by the nut 16 with the outer face of the cap 14 drawing the outer hub-member into rigid frictional engagement with the inner hub-member to cause them to operate as a unitary structure when the wheel is operated. The removal of the outer hub-member is effected by rotating the spindle 12 in the opposite direction in the cap 14, the spindle, as it unscrews from the inner hub-member forcing the outer hub-member from the inner hub-member by engaging at its shoulder 18 with the inner face of the cap 14.

It will be understood from the foregoing that the single spindle-device operates to either force the outer hub-member into firm engagement with the inner hub-member, or force it from the latter, depending on the direction in which the spindle 12 is rotated.

The cap 14 is recessed at its outer face, as represented at 19, the sides of the recess being angularly disposed, as for example as illustrated, adapting the cap to be screwed into, or out of, operative position on the outer member 6, as desired, as for example when access to the interior of the hub-member 6 is necessary to replace spokes.

A wheel structure constructed in accordance with my invention is not only simple and economical to build, but contains within itself provision for readily assembling and disassembling the parts. Another advantage consists in having the parts so arranged that in removing the outer hub-member 6 from the inner hub-member, it is not necessary to first remove caps, or other parts, which are apt to become misplaced and lost. Furthermore, the spindle and cap may be operated for the purposes stated, by an ordinary wrench, instead of requiring a special form of tool.

The feature of providing the boss on the cap 14 and in which the portion 13 of the spindle 12 is journaled, is desirable in that the cap may be made relatively thin to economize metal and minimize weight of the parts and still present a sufficiently long guide-bearing for insuring the speedy catching of the threads on the part 11 with the part 10 in the operation of applying a wheel to the hub 5. Again, the feature of recessing the cap 14 is desirable, and especially where the cap screws into the outer end of the hub 6, as the nut 16 through the medium of which the spindle 12 is operated, is protected against force tending to turn the spindle 12 and to which it might be subjected if the nut 16 extended beyond the cap, should the vehicle equipped with the construction be so driven that it strikes at the end of the wheel against a curb, wall or other structure.

What I claim as new and desire to secure by Letters Patent, is:

1. A demountable hub formed of an inner hub-member of tapering form, an outer hub-member of tapering form and telescoping said inner hub-member, said inner hub-member reaching short of the outer end of said outer hub-member and internally threaded at its outer end, a cap screwed on the outer end of said outer hub-member, a threaded member having journal fit in said cap, said threaded member screwing into the threads in said inner hub-member and provided with shoulders located at opposite sides of said cap to respectively engage said opposite sides and force said outer hub-member at its tapering surface into and out of tight engagement, respectively, with the tapering surface of said inner hub-member, when said threaded member is rotated in opposite directions.

2. A demountable hub formed of an inner hub-member of tapering form, an outer hub-member of tapering form and telescoping said inner hub-member, said inner hub-member being internally threaded at its outer end, a cap screwed on said outer member and provided substantially centrally with a boss, a threaded member having journal fit in the boss on said cap, said threaded member screwing into the threads in said inner hub and provided with shoulders located at opposite sides of said cap to respectively engage said opposite sides and force said outer hub-member at its tapering surface into and out of tight engagement, respectively, with the tapering surface of said inner hub-member, when said threaded member is rotated in opposite directions.

3. A demountable hub formed of an inner hub-member of tapering form, an outer hub-member of tapering form and telescoping said inner hub-member, said inner hub-member being internally threaded at its outer end, a cap screwed on said outer member and having its outer face recessed, a threaded member having journal fit in said cap, said threaded member screwing into the threads in said inner hub and provided with shoulders located at opposite sides of said cap to respectively engage said opposite sides and force said outer hub-member at its tapering surface into and out of tight engagement, respectively, with the tapering surface of said inner hub-member, when said threaded member is rotated in opposite directions, the outer end of said threaded member being located within the confines of said recess and so formed as to adapt the said threaded member to be operated by a suitable tool applied to said outer portion, whereby said cap forms a journal for said threaded member and protects the latter against accidental rotation.

4. A demountable hub formed of an inner hub-member of tapering form, an outer hub-member of tapering form and telescoping said inner hub-member, said inner hub-member being internally threaded at its outer end, a cap screwing into the outer end of said outer hub-member, a threaded member having journal fit in said cap, said threaded member screwing into the threads in said inner hub and provided with shoulders located at opposite sides of said cap to respectively engage said opposite sides and force said outer hub-member at its tapering surface into and out of tight engagement, respectively, with the tapering surface of said inner hub-member, when said threaded member is rotated in opposite directions.

5. A demountable hub formed of an inner hub-member of tapering form, an outer hub-member of tapering form and telescoping said inner hub-member, said inner hub-member being internally threaded at its outer end, a cap screwed on said outer member and provided with a boss, a threaded member having journal fit in said boss, said threaded member screwing into the threads in said inner hub and provided with shoulders located at opposite sides of said cap, to respectively engage said opposite sides and force said outer hub-member at its tapering surface into and out of tight engagement, respectively, with the tapering surface of said inner hub-member, when said threaded member is rotated in opposite directions.

JOHN KELLY.

In presence of—
 L. HEISLAR,
 JOSEPH SCHWARTZ.

Copies of this patent may be obtained for five cents each, by addressing the "Commissioner of Patents, Washington, D C."